(12) United States Patent
Kato

(10) Patent No.: US 6,523,271 B2
(45) Date of Patent: Feb. 25, 2003

(54) METHOD OF ADJUSTING DRIVE CURRENT OF MAGNETISM SENSOR AND ELECTRONIC AZIMUTH METER

(75) Inventor: Kazuo Kato, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/910,111

(22) Filed: Jul. 20, 2001

(65) Prior Publication Data

US 2002/0014016 A1 Feb. 7, 2002

(51) Int. Cl.[7] .................... G01C 17/02; G01C 17/28
(52) U.S. Cl. .................... 33/355 R; 33/356; 33/361; 324/247; 702/92; 702/154; 73/1.76
(58) Field of Search .................... 33/355 R, 361, 33/363 Q, 356, 357; 324/352, 247; 702/150, 152, 92; 73/1.75, 1.76

(56) References Cited

U.S. PATENT DOCUMENTS

| | | | |
|---|---|---|---|
| 3,991,361 A | | 11/1976 | Mattern et al. |
| 4,104,803 A | * | 8/1978 | Hoeppel .................... 33/356 |
| 4,143,467 A | * | 3/1979 | Erspamer et al. .................... 33/356 |
| 4,338,810 A | * | 7/1982 | Gollomp .................... 73/1.76 |
| 4,429,469 A | * | 2/1984 | Tsushima et al. .................... 33/356 |
| 5,165,269 A | * | 11/1992 | Nguyen .................... 33/356 |
| 5,216,816 A | * | 6/1993 | Ida .................... 33/356 |
| 5,297,063 A | * | 3/1994 | Cage .................... 33/356 |
| 6,147,626 A | * | 11/2000 | Sakakibara .................... 33/356 |
| 6,232,775 B1 | * | 5/2001 | Naitoh et al. .................... 324/247 |

FOREIGN PATENT DOCUMENTS

DE   3903439   8/1990

* cited by examiner

Primary Examiner—Diego Gutierrez
Assistant Examiner—Madeline Gonzalez
(74) Attorney, Agent, or Firm—Adams & Wilks

(57) ABSTRACT

To reduce a dispersion in a sensitivity of a magnetism detecting circuit driving, by current, a magnetism sensor comprising magnetism resistance elements in a bridge constitution to a dispersion in a sensitivity of a magnetism sensor. An electronic azimuth meter is provided with EEPROM and drive current set values are previously stored to EEPROM. The drive current set values are calculated by a predetermined calculation by measuring bridge resistance of a magnetism sensor of the electronic azimuth meter. In detecting magnetism by the magnetism sensor, CPU controls a sensor drive circuit based on the drive current set values stored to EEPROM. Thereby, the sensor drive circuit supplies a magnetism sensor with optimum drive current in accordance with a bridge resistance value thereof.

15 Claims, 5 Drawing Sheets

PRIOR ART

FIG. 6

| BRIDGE RESISTANCE Rb [kΩ] | SENSITIVITY Sd [(mV/V)/(kA/m)] | DRIVE CURRENT Ib [mA] | BRIDGE VOLTAGE Vb [V] | SENSITIVITY Sa [mV/(kA/m)] |
|---|---|---|---|---|
| 1.0 | 4.0 | 1.0 | 1.0 | 4.0 |
| 1.0 | 8.0 | 1.0 | 1.0 | 8.0 |
| 1.5 | 4.0 | 1.0 | 1.5 | 6.0 |
| 1.5 | 8.0 | 1.0 | 1.5 | 12.0 |
| 2.0 | 4.0 | 1.0 | 2.0 | 8.0 |
| 2.0 | 8.0 | 1.0 | 2.0 | 16.0 |

FIG. 7

| DRIVE CURRENT SET VALUE DC | BRIDGE RESISTANCE Rb [kΩ] | SENSITIVITY Sd [(mV/V)/(kA/m)] | DRIVE CURRENT Ib [mA] | BRIDGE VOLTAGE Vb [V] | SENSITIVITY Sa [mV/(kA/m)] |
|---|---|---|---|---|---|
| 15 | 1.0 | 4.0 | 1.8 | 1.8 | 7.4 |
| 15 | 1.0 | 8.0 | 1.8 | 1.8 | 14.8 |
| 3 | 1.5 | 4.0 | 1.2 | 1.8 | 7.2 |
| 3 | 1.5 | 8.0 | 1.2 | 1.8 | 14.5 |
| 0 | 2.0 | 4.0 | 1.0 | 2.1 | 8.4 |
| 0 | 2.0 | 8.0 | 1.0 | 2.1 | 16.7 |

METHOD OF ADJUSTING DRIVE CURRENT OF MAGNETISM SENSOR AND ELECTRONIC AZIMUTH METER

BACKGROUND OF THE INVENTION

1. Field of the Invention

The present invention relates to a method of adjusting drive current of a magnetism sensor driven by constant current and an electronic azimuth meter having a magnetism sensor, particularly to restraining a dispersion in a sensitivity of an electronic azimuth meter having a magnetism sensor and promoting the sensitivity.

2. Description of the Prior Art

As shown, by a block circuit diagram of FIG. 5, a conventional electronic azimuth meter is constituted by a magnetism sensor 10, a sensor drive circuit 20 for driving the magnetism sensor 10 by constant current, a selecting circuit 30 for selecting the magnetism sensor driven by the sensor drive circuit 20, CPU 51 for determining an azimuth by subjecting a magnetic field output signal of the magnetism sensor 10 to a digital signal processing, ROM 52 stored with a firmware program and the like for controlling operation of the electronic azimuth meter, RAM 53 stored with processing data and the like, a key input circuit 54 for inputting information of start/stop of the electronic azimuth meter and the like, a display apparatus 55 for displaying information of an azimuth and the like, a display drive circuit 56 for driving the display apparatus 55, an oscillating circuit 57 and a dividing circuit 58.

The magnetism sensor 10 is constituted by two pieces of magnetism sensor bridges arranged orthogonally to each other, that is, an X-axis magnetism sensor and a Y-axis magnetism sensor. The respective magnetism sensor bridge is a magnetism sensor module constituted by four pieces of magnetoresistive elements connected in Wheatstone bridge type.

The sensor drive circuit 20 is a circuit for supplying constant current of drive current to the magnetism sensor 10. That is, the sensor drive circuit 20 supplies constant current for driving, for example, constant current of a constant value having a magnitude of 1 [mA] to the four pieces of magnetoresistive elements connected in Wheatstone bridge type.

Characteristics of the magnetoresistive elements constituting the magnetism sensor 10 are made to be as uniform as possible since the magnetism sensor 10 is driven by the constant value of the constant current. However, owing to restriction in view of fabrication, actually, the characteristics of the magnetoresistive elements constituting the magnetism sensor 10 cannot be made to be uniform sufficiently.

For example, bridge resistance Rb of the magnetoresistive element constituting the magnetism sensor 10 and sensitivity Sd of the magnetoresistive element are dispersed independently from each other. Specifically, as shown by FIG. 6, whereas the bridge resistance Rb is dispersed as 1.0 [kΩ], 1.5 [kΩ], 2.0 [kΩ], in contrast to the respective bridge resistance Rb, the sensitivity Sd is dispersed as 4.0 through 8.0 [(mV/V)/(kA/m)]. When current Ib having a magnitude of 1 [mA] is supplied to these samples, a dispersion of bridge voltage Vb (=Ib×Rb) becomes 1.0 through 2.0 [V] and accordingly, sensitivity Sa (=Sd×Vb) of the magnetism detecting circuit is dispersed as 4.0 through 16.0 [mV/(kA/m)] or four times as large as the dispersion.

When the dispersion of the sensitivity Sa of the magnetism detecting circuit is large in this way, according to a portable electronic azimuth meter having a magnetism sensor, the following problem is posed since the power source is a battery. First, owing to the battery drive, an upper limit of the bridge voltage Vb generated at the bridge resistance Rb is restricted by the battery voltage. Specifically, when a lithium battery is used, the battery is operated from an initial stage of 3.0 [V] to a final stage of 2.0 through 2.4 [V] and accordingly, the bridge voltage Vb is restricted to be equal to or lower than the value. Further, a maximum value of sensor drive current Ib necessarily becomes Vb/Rb provided by dividing the bridge voltage Vb by the bridge resistance Rb. Since the bridge resistance Rb of the magnetism sensor is dispersed, in the case of conventional constant current drive, the drive current Ib is set from a maximum value of the bridge resistance Rb. Under the condition of the drive current Ib set in this way, in the case of a sample in which the bridge resistance Rb is minimized and the sensitivity Sa is minimized by the dispersion in the magnetism sensor, the sensitivity Sa of the magnetism detecting circuit is reduced. When an electronic azimuth meter is constituted by such a magnetism sensor, there poses a problem that accuracy of the electronic azimuth meter is deteriorated.

It is a problem to be resolved to reduce a dispersion in a sensitivity Sa of a magnetism detecting circuit caused in the case of driving a magnetism sensor comprising magnetoresistive elements in a bridge constitution by constant current, to a dispersion in a sensitivity Sd of the magnetism sensor per se.

SUMMARY OF THE INVENTION

In order to resolve the above-described problem, according to a magnetism detecting circuit for driving, by current, a magnetism sensor comprising magnetoresistive elements in a bridge constitution, drive current Ib of the magnetism sensor is made adjustable in accordance with a bridge resistance value Rb of the magnetism sensor.

That is, a method of adjusting drive current of a magnetism sensor according to the invention is constituted by the following steps.

(1) a step of respectively measuring bridge resistance of the X-axis magnetism sensor and bridge resistance of the Y-axis magnetism sensor;

(2) a step of respectively calculating the drive current set value of the X-axis magnetism sensor and the drive current set value of the Y-axis magnetism sensor from measured values of the bridge resistance of the X-axis magnetism sensor and the bridge resistance of the Y-axis magnetism sensor: and (3) a step of respectively storing the drive current set value of the X-axis magnetism sensor and the drive current set value of the Y-axis magnetism sensor to the drive current storing means.

Further, a number of the drive current set value is N and is represented by an integer provided by equally dividing a certain range by N, further specifically, N is set to 16.

Further, an electronic azimuth meter according to the invention is constituted by magnetism sensor means comprising an X-axis magnetism sensor and a Y-axis magnetism sensor, drive current set value storing means for storing drive current set values, sensor driving means having a drive current source capable of supplying drive current adjustable in a range of N steps for storing drive current in correspondence with the drive current set values stored to the drive current set value storing means to the magnetism sensor means, A/D conversion means for converting an analog output of the magnetism sensor means into a digital output, azimuth calculating means for outputting an azimuth signal by subjecting the digital output of the A/D conversion means to predetermined calculation, displaying means for displaying an azimuth based on the azimuth signal of the azimuth calculating means, and sensor controlling means for controlling the means.

Further, a number of the drive current set value is N and is represented by an integer provided by equally dividing a certain range by N, further specifically, N is set to 16.

Further, an electronic azimuth meter according to the invention is constituted by magnetism sensor means comprising an X-axis magnetism sensor and a Y-axis magnetism sensor, drive current set value storing means for storing drive current set values, sensor driving means having a drive current source capable of supplying drive current adjustable in a range of N steps for storing drive current in correspondence with the drive current set values stored to the drive current set value storing means to the magnetism sensor means, A/D conversion means for converting an analog output of the magnetism sensor means into a digital output, azimuth calculating means for outputting an azimuth signal by subjecting the digital output of the A/D conversion means to predetermined calculation, displaying means for displaying an azimuth based on the azimuth signal of the azimuth calculating means, and sensor controlling means for controlling the means, further, there is used the drive current set value storing means stored with the drive current set values provided by the following steps.

(1) a step of respectively measuring bridge resistance of the X-axis magnetism sensor and bridge resistance of the Y-axis magnetism sensor; and (2) a step of respectively calculating the drive current set value of the X-axis magnetism sensor and the drive current set value of the Y-axis magnetism sensor from measured values of the bridge resistance of the X-axis magnetism sensor and the bridge resistance of the Y-axis magnetism sensor.

Further, a number of the drive current set value is N and is represented by an integer provided by equally dividing a certain range by N, further specifically, N is set to 16.

Further, an electronic azimuth meter comprising: a magnetism sensor comprising an X-axis magnetism sensor and a Y-axis magnetism sensor; a drive current set value storing circuit to store drive current set values; a sensor driving circuit having a drive current source capable of supplying drive current adjustable in a range of N steps for storing drive current in correspondence with the drive current set values stored to the drive current set value storing circuit to the magnetism sensor; an A/D converter to converte an analog output of the magnetism sensor into a digital output; an azimuth calculator to output an azimuth signal by subjecting the digital output of the A/D converter to predetermined calculation; a display to display an azimuth based on the azimuth signal of the azimuth calculator; and a sensor controller to control the devices.

Further, an electronic azimuth meter comprising: a magnetism sensor comprising an X-axis magnetism sensor and Y-axis magnetism sensor; a drive current set value storing circuit to store drive current set values; a sensor driving circuit having a drive current source capable of supplying drive current adjustable in a range of N steps for storing drive current in correspondence with the drive current set values stored to the drive current set value storing circuit to the magnetism sensor; an A/D converter to convert an analog output of the magnetism sensor into a digital output; an azimuth calculator to output an azimuth signal by subjecting the digital output of the A/D converter to predetermined calculation; a display to display an azimuth based on the azimuth signal of the azimuth calculator; and a sensor controller to control the device; wherein the drive current set values are stored to the drive current set value storing cirtcuit by the following steps of:

(1) a step of respectively measuring bridge resistance of the X-axis magnetism sensor and bridge resistance of the Y-axis magnetism sensor; and (2) a step of respectively calculating the drive current set value of the X-axis magnetism sensor and the drive current set value of the Y-axis magnetism sensor from measured values of the bridge resistance of the X-axis magnetism sensor and the bridge resistance of the Y-axis magnetism sensor.

Further, the electronic azimuth meter characterized in that a number of the drive current set values is N and is represented by an integer provided by equally dividing a certain range by N.

Further, the electronic azimuth meter characterized in that N is 12.

BRIEF DESCRIPTION OF THE DRAWINGS

A preferred form of the present invention is illustrated in the accompanying drawings in which:

FIG. 6 is a diagram representing characteristics of a conventional magnetism sensor; and FIG. 7 is a diagram representing characteristics of a magnetism sensor according to the invention.

DETAILED DESCRIPTION OF THE PREFERRED EMBODIMENTS

First, a detailed explanation will be given of an electronic azimuth meter according to an embodiment of the invention.

Figure 1:
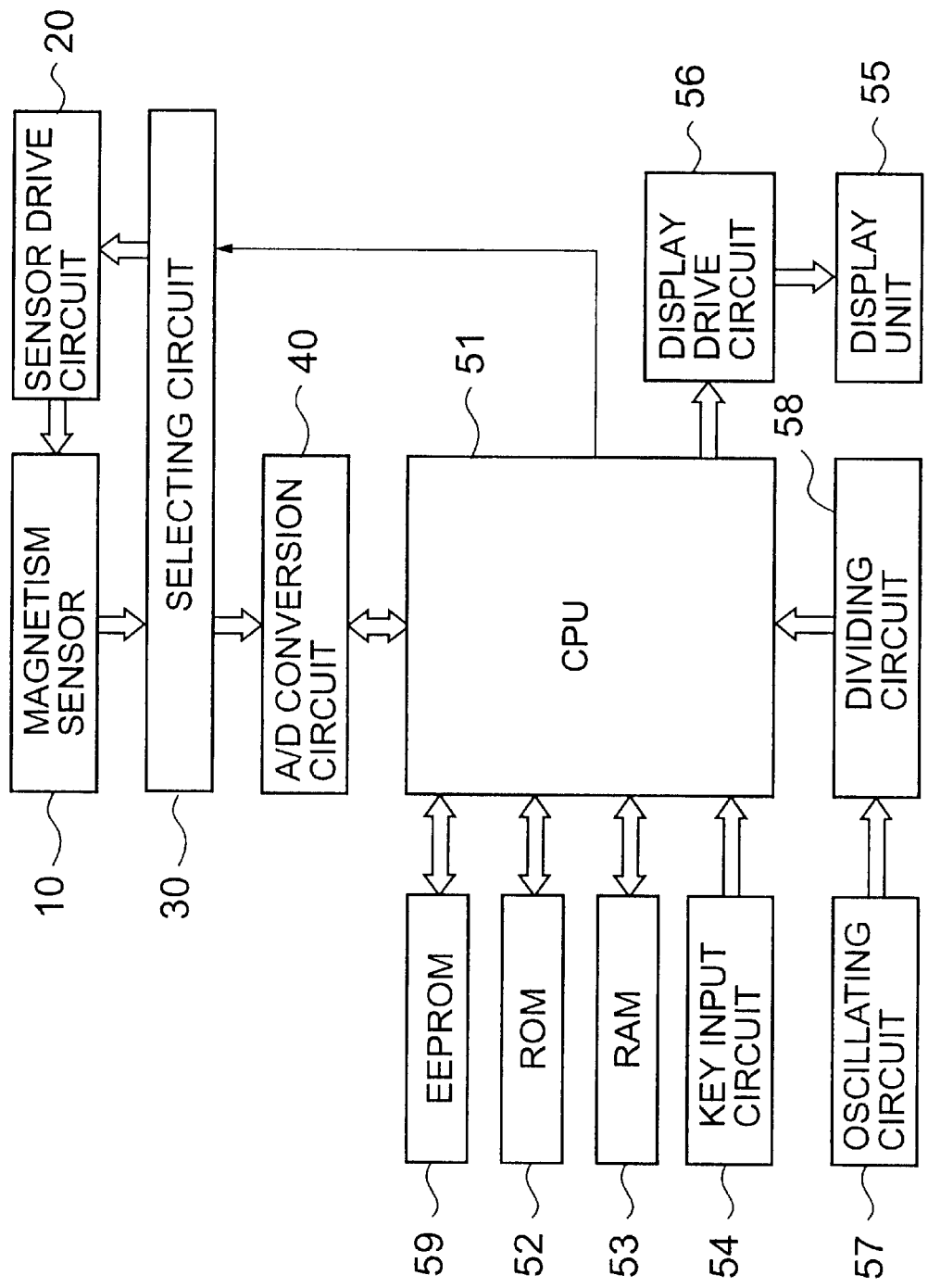
FIG. 1 is a constitution diagram of an electronic azimuth meter according to the invention.

As shown by a block circuit diagram of FIG. 1, the electronic azimuth meter according to the embodiment of the invention is constituted by the magnetism sensor 10, the sensor drive circuit 20 for driving the magnetism sensor 10 by constant current, the selecting circuit 30 for selecting the magnetism sensor driven by the sensor drive circuit 20, CPU 51 for determining an azimuth by subjecting a magnetic field output signal of the magnetism sensor 10 to a digital signal processing, ROM 52 stored with a firmware program and the like for controlling operation of the electronic azimuth meter, RAM 53 stored with processing data and the like, the key input circuit 54 for inputting information of start/stop of the electronic azimuth meter and the like, the display apparatus 55 for displaying the azimuth and the like, the display drive circuit 56 for driving the display apparatus 55, the oscillating circuit 57, the dividing circuit 58 and EEPROM 59 previously stored with drive current set values.

The magnetism sensor 10 is constituted by two pieces of magnetism sensor bridges arranged orthogonally to each other, that is, an X-axis magnetism sensor and a Y-axis magnetism sensor. The respective magnetism sensor bridge is a magnetism sensor module constituted by four pieces of magnetoresistive elements connected in Wheatstone bridge type.

The sensor drive circuit 20 is a circuit for supplying drive current to the magnetism sensor 10. That is, the sensor drive circuit 20 is a drive current supply circuit capable of supplying drive current of N steps, specifically, 16 steps. For example, as shown by FIG. 7, the drive current of 16 steps is constant current of 16 steps in which a lower limit value thereof is 1.0 [mA], an upper limit value thereof is 1.8 [mA] and an interval therebetween is constituted by values of 0.05 [mA] increments.

CPU 51 controls the sensor drive circuit 20 to supply drive current having a magnitude in correspondence with a drive current set value stored to EEPROM 59. For example, as shown by FIG. 7, the drive current set values DC are 16 of values in which a lower limit value thereof is 0, an upper limit value thereof is 15 and an interval therebetween is constituted by values of increments of 1 and respectives thereof correspond to the drive current of 16 steps. That is, the drive current set value 0 corresponds to the drive current 1.0 [mA], the drive current set value 3 corresponds to the drive current 1.2 [mA] and the drive current set value 15 corresponds to the drive current 1.8 [mA], respectively. Further, the drive current set values stored to EEPROM 59 are drive current set values of the X-axis magnetism sensor and drive current set values of the Y-axis magnetism sensor.

The selecting circuit 30 connected between the magnetism sensor 10 and an A/D conversion circuit 40, is controlled by CPU 51 in accordance with a control program stored to ROM 52 for selecting either of the X-axis magnetism sensor and the Y-axis magnetism sensor.

When the X-axis magnetism sensor is selected, the X-axis magnetism sensor is supplied with the drive current in correspondence with the drive current set value for the X-axis magnetism sensor stored to EEPROM 59 from the sensor drive circuit 20. This is carried out by controlling the sensor drive circuit 20 by CPU 51 via the A/D conversion circuit 40 and the selecting circuit 30 in accordance with the control program stored to ROM 52. The X-axis magnetism sensor supplied with the drive current, detects a magnetic field and outputs an X-axis magnetic field output as analog voltage. The analog voltage output is converted into an X-axis magnetic field output of a digital signal by the A/D conversion circuit 40. Further, CPU 51 stores the inputted X-axis magnetic field output of the digital signal to RAM 53.

Next, when the Y-axis magnetism sensor is selected, the Y-axis magnetism sensor is supplied with the drive current in correspondence with the drive current set value for the Y-axis magnetism sensor stored to EEPROM 59 from the sensor drive circuit 20. This is carried out by controlling the sensor drive circuit 20 by CPU 51 via the A/D conversion circuit 40 and the selecting circuit 30 in accordance with the control program stored to ROM 52. The Y-axis magnetism sensor supplied with the drive current, detects the magnetic field and outputs a magnetic field output in the Y-axis direction as analog voltage. The analog voltage output is converted into a digital signal by the A/D conversion circuit 40 and is inputted to CPU 51. Further, CPU 51 stores the inputted Y-axis magnetic field output of the digital signal to RAM 53.

Successively, CPU 51 reads the X-axis magnetic field output and the Y-axis magnetic field output stored to RAM 53, determines the azimuth by carrying out a predetermined digital signal processing and outputs an azimuth signal to the display drive circuit 56 and the display drive circuit 56 displays the azimuth at the display unit 55.

The electronic azimuth meter according to the invention is characterized in that in the electronic azimuth meter having the magnetism detecting circuit for driving, by current, the magnetism sensor comprising the magnetoresistive elements in the bridge constitution, the drive current of the magnetism sensor is made adjustable in accordance with the bridge resistance value of the magnetism sensor and accordingly, there is significantly reduced the dispersion in the sensitivity Sa of the magnetism detecting circuit of the electronic azimuth meter according to the invention in respective products.

That is, with regard to a total of six pieces of magnetism sensors of two pieces of magnetism sensors having the bridge resistance Rb of 1.0 [kΩ], two pieces of magnetism sensors having the bridge resistance Rb of 1.5 [kΩ] and two pieces of magnetism sensors having the bridge resistance Rb of 2.0 [kΩ], the sensitivity Sa of the magnetism measuring circuit which is measured by changing, in steps, the drive current Ib in a range of 1.0 through 1.8 [mA] in accordance with the bridge resistance values, falls in a range of 7.2 through 16.7 [mV/(kA/m)] as shown by FIG. 7. In contrast thereto, the dispersion Sa in the sensitivity of the magnetism detecting circuit which is measured by supplying the drive current Ib having the magnitude of 1 [mA] with regard to six pieces of the same samples, falls in a range of 4.0 through 16.0 (mV/(kA/m)] as shown by FIG. 6. Therefore, there is significantly reduced the dispersion in the sensitivity Sa of the magnetism detecting circuit of the electronic azimuth meter according to the invention in respective products.

Next, a detailed explanation will be given of an embodiment of a method of adjusting drive current of a magnetism sensor according to the invention.

Figure 2:
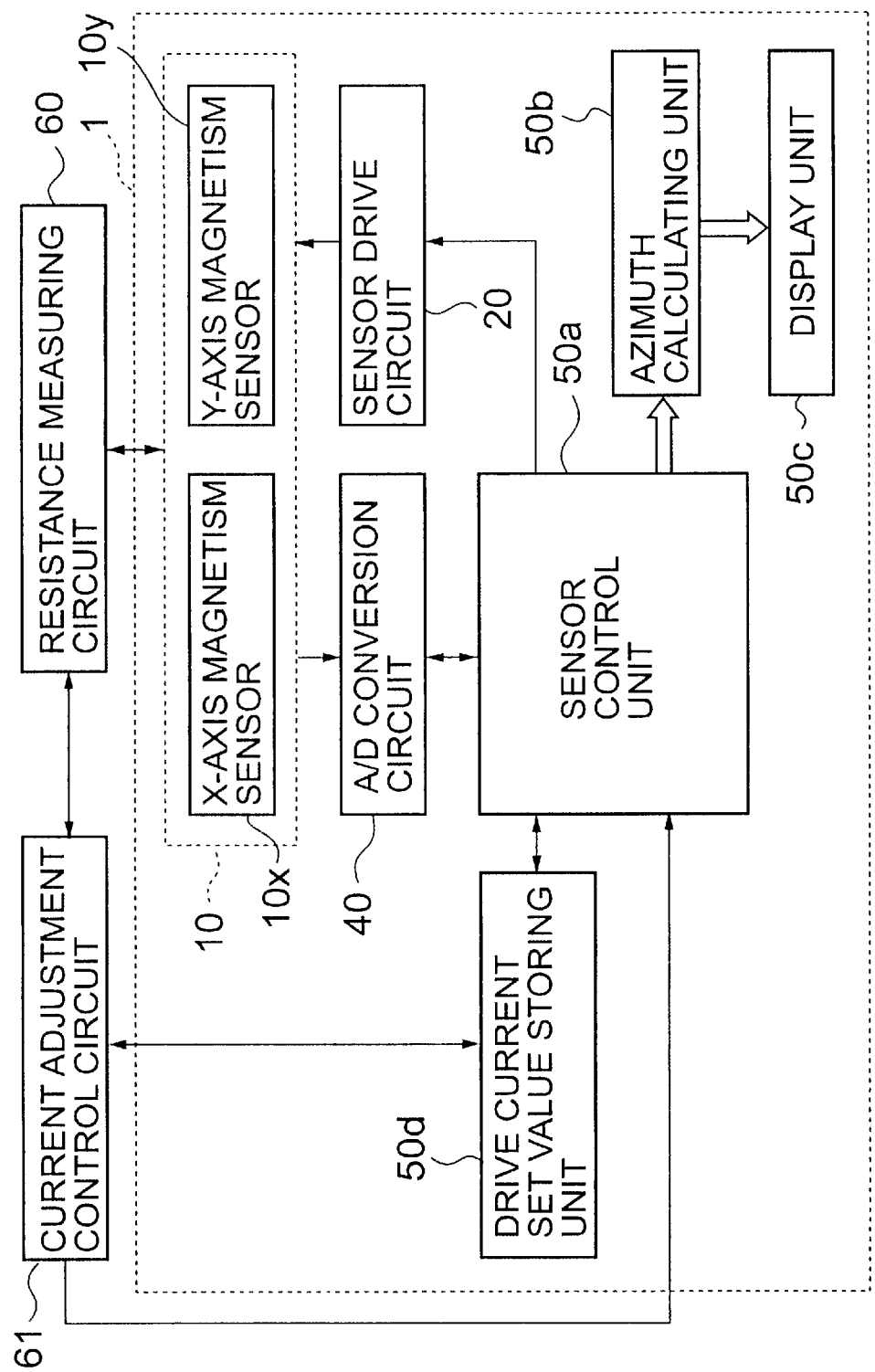
FIG. 2 is a functional block diagram of an electronic azimuth meter in a state of being applied with a method of adjusting drive current according to the invention.

FIG. 2 is a block diagram when a method of adjusting drive current of a magnetism sensor according to the invention is applied to an electronic azimuth meter 1 shown by a functional block diagram. The electronic azimuth meter in FIG. 2 functionally shows the electronic azimuth meter of FIG. 1 and is constituted by the magnetism sensor 10 comprising an X-axis magnetism sensor $10_X$ and a Y-axis magnetism sensor $10_Y$, a drive current set value storing unit 50d stored with drive current set values, a sensor drive circuit 20 having a drive current source capable of supplying drive current adjustable in a range of 16 steps for supplying the drive current in correspondence with the drive current set values stored to the drive current set value storing unit 50d, the A/D conversion circuit 40 for converting an analog output of the magnetism sensor 10 into a digital output, an azimuth calculating unit 50b for outputting an azimuth signal by subjecting the digital output of the A/D conversion circuit 40 to a predetermined calculation, the display unit 50c for displaying an azimuth based on the azimuth signal of the azimuth calculating unit 50b and a sensor control unit 50a for controlling these.

A resistance measuring circuit 60 and a current adjustment control circuit 61 are connected to the electronic azimuth meter 1 for adjusting the drive current of the magnetism sensor. The resistance measuring circuit 60 is a sensor bridge resistance measuring circuit for respectively measuring bridge resistance $R_{BX}$ of the X-axis magnetism sensor $10_X$ and bridge resistance $R_{BY}$ of the Y-axis magnetism sensor $10_Y$ and an embodiment thereof is shown by FIG. 3 further specifically.

Figure 3:
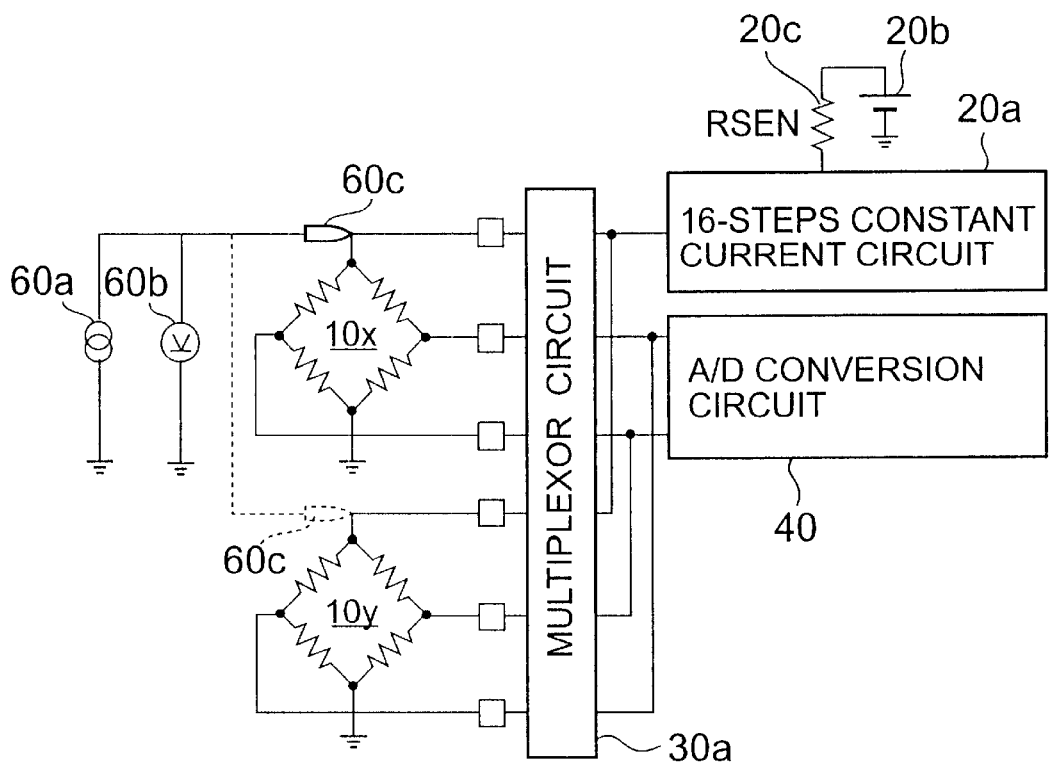
FIG. 3 is a diagram showing an embodiment of a magnetism detecting circuit of FIG. 2.

That is, in FIG. 3 which is a circuit diagram showing an example of a specific method of measuring bridge resistance of the magnetism sensor, respective pairs of bridge output terminal of the X-axis magnetism sensor $10_X$ and the Y-axis magnetism sensor $10_Y$, are connected to analog input terminals of the A/D conversion circuit 40 via a multiplexor circuit 30a. Further, respective power source terminals of the X-axis magnetism sensor $10_X$ and the Y-axis magnetism sensor $10_Y$, are connected to a drive current supply terminal of a 16-steps constant current circuit 20a via the multiplexor circuit 30a. The 16-steps constant current circuit 20a, a battery power source 20b and a rough adjustment resistor 20c, constitute the sensor drive circuit 20.

In FIG. 3, the resistance measuring circuit 60 includes a constant current source 60a, a voltage meter 60b and a probe 60c.

The current adjustment control circuit 61 includes, at least, a drive current set value calculating unit for respectively calculating a drive current set value $DC_X$ of the X-axis magnetism sensor and a drive current set value $DC_Y$ of the Y-axis magnetism sensor and EEPROM writer for writing the drive current set value $DC_X$ and the drive current set value $DC_Y$ to the drive current set value storing unit 50d.

Figure 4:
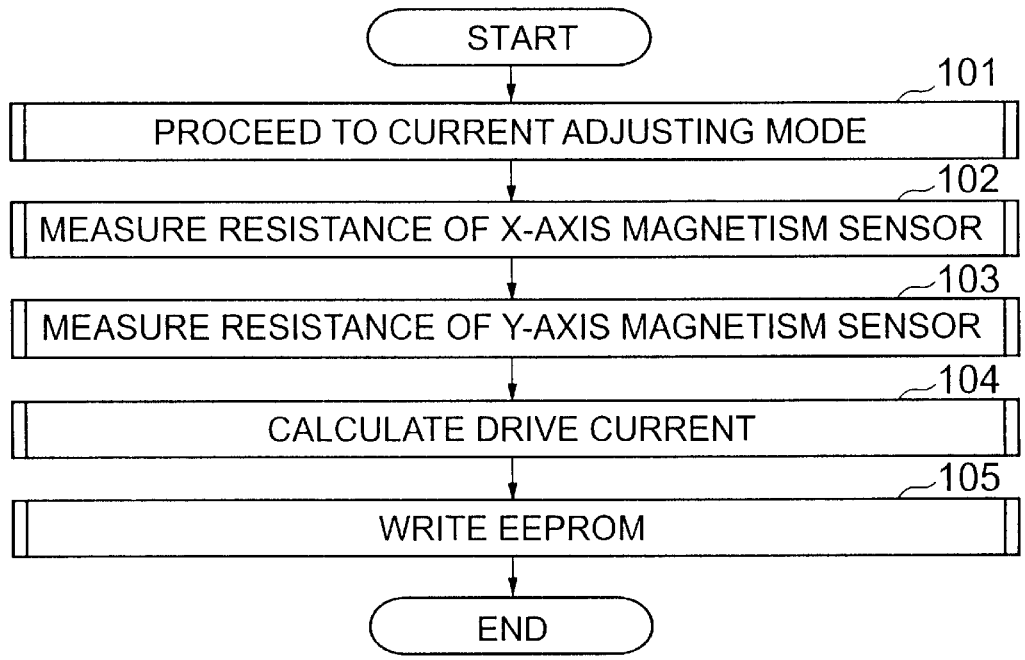
FIG. 4 is a basic flow chart showing a flow of adjusting drive current of a magnetism sensor according to the invention.
Figure 5:
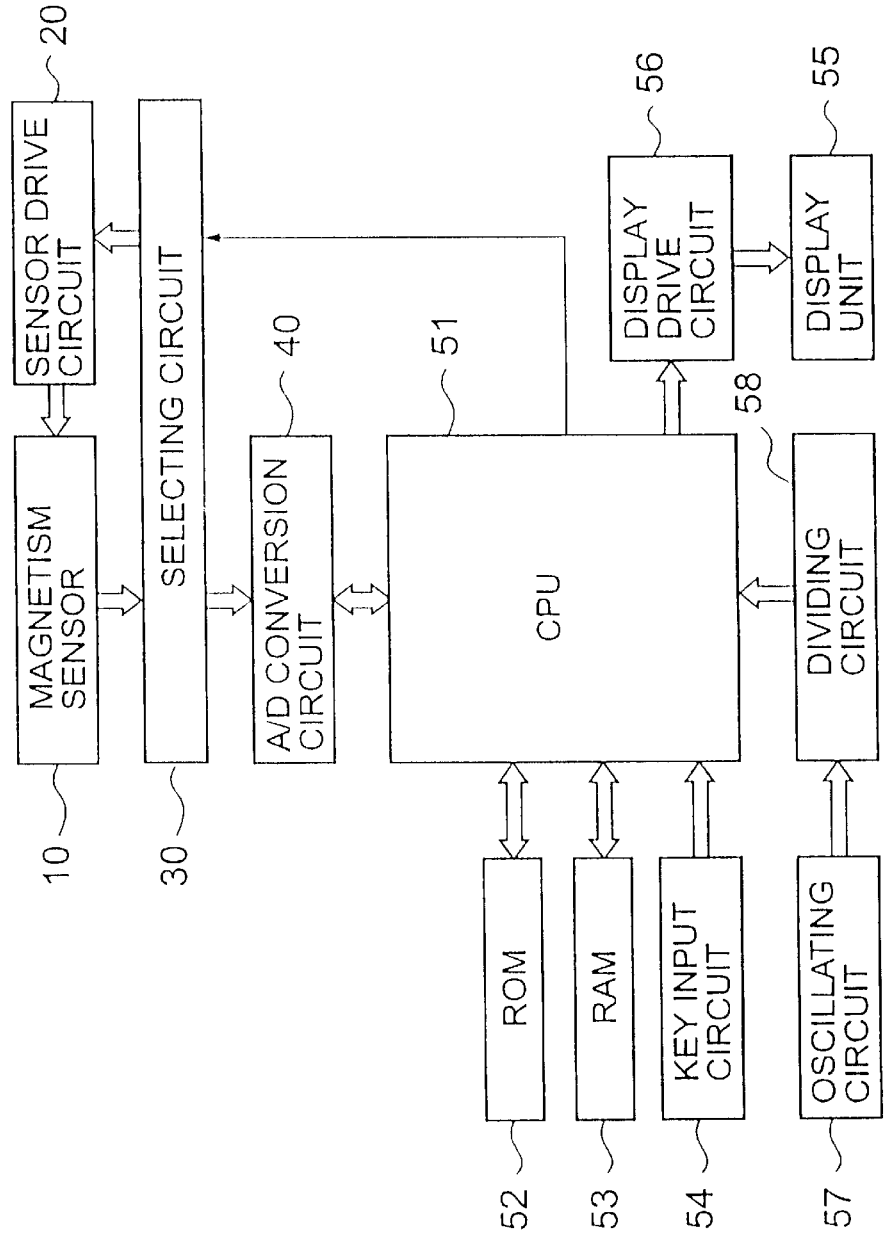
FIG. 5 is a constitution diagram of a conventional electronic azimuth meter.

Operation for adjusting drive current of a magnetism sensor according to the invention is carried out basically in accordance with a flow chart of FIG. 4. First, the operation starts to proceed to a current adjustment mode by connecting the resistance measuring circuit 60 and the current adjustment control circuit 61 to the electronic azimuth meter as shown by FIG. 2 and FIG. 3 (101). At step 101, the current adjustment control circuit 61 inputs a signal indicating that operation proceeds to the current adjustment mode to the sensor control unit 50a. Then, the sensor control unit 50a opens paths of the sensor drive circuit 20 and the drive current setting unit 50d. Further specifically, in FIG. 1, the current adjustment control circuit 61 inputs the signal indicating that the operation proceeds to the current adjustment mode to CPU 51 via the key input circuit 54 and CPU 51 opens signal lines of the sensor drive circuit 20 and EEPROM 59.

Successive to step 101, the current adjustment control circuit 61 measures the bridge resistance $R_{BX}$ of the X-axis magnetism sensor via the resistance measuring circuit 60 (102).

Successive to step 102, the current adjustment control circuit 61 measures the bridge resistance $R_{BY}$ of the Y-axis magnetism sensor via the resistance measuring circuit 60 (103).

Successive to step 103, the drive current set value calculating unit of the current adjustment control circuit 61, respectively calculates the drive current set value $DC_X$ of the X-axis magnetism sensor and the drive current set value $DC_Y$ of the Y-axis magnetism sensor from measured values of the bridge resistance $R_{BX}$ of the X-axis magnetism sensor and the bridge resistance $R_{BY}$ of the Y-axis magnetism sensor (104).

Calculation of the drive current set value DC is carried out in accordance with, for example, equations shown below. Further, the drive current set value DC is represented by an integer provided by equally dividing an interval between a lower limit value and an upper limit value by N. For example, as shown by FIG. 7, the drive current set value DC is represented by 16 of integers provided by equally dividing an interval between a lower limit value 0 and an upper limit value 15 by 16. N is set to 16 because inner data is processed by 4 bits.

$$V_{sen}=2\times(a\times DC+b) \quad \text{Equation (1)}$$

$$I_b=V_{sen}/R_{sen}=2\times(a\times DC+b)/R_{sen} \quad \text{Equation (2)}$$

$$V_b=I_b\times R_b=2\times(a\times DC+b)R_b/R_{sen} \quad \text{Equation (3)}$$

$$V_b\times R_{sen}/(2R_b)=a\times DC+b \quad \text{Equation (4)}$$

$$DC=int\{[V_b\times R_{sen}/(2\times R_b)-b]/a\} \quad \text{Equation (5)}$$

Equation (5) is derived as follows. Output current of the sensor drive circuit 20 used in the invention is constituted to determine by the rough adjustment resistor $R_{sen}$ and the drive current set value DC (Drive Current). Voltage $V_{sen}$ applied across both ends of the rough adjustment resistor $R_{sen}$ and the drive current set value DC are under a relationship shown by equation (1) and notations a and b designate coefficients, $V_{sen}/R_{sen}$ corresponds to the sensor drive current $I_b$ and is shown by equation (2). In this case, voltage $V_b$ applied to the bridge resistance of the magnetism sensor is a product of the sensor drive current $I_b$ and the bridge resistance $R_b$ and accordingly, the voltage $V_b$ is represented by equation (3). When equation (3) is rearranged with respect to the drive current set value DC, equation (5) is derived via equation (4).

Specifically, $V_b$ is set to 1.9 [V] in consideration of the battery drive voltage 2.4 [V]. $R_{sen}$ is set to 300 [ ] by calculation from equation (2) such that maximum drive current becomes $I_b$=1,8[mA] when DC=15. The coefficient a is 0.008 [V/step] and the coefficient b is 0.157 [V]. Further, notation int of equation (5) is a symbol signifying integer formation.

Successive to step 104, the current adjustment control circuit 61 respectively writes the drive current set value $DC_X$ of the X-axis magnetism sensor and the drive current set value $DC_Y$ of the Y-axis magnetism sensor to the drive current set value storing unit 50d or EEPROM 59 of FIG. 1 (105).

When step 105 has been finished, the current adjustment control circuit 61 and the resistance measuring circuit 60 are removed from the electronic azimuth meter 1. Then, the sensor control unit 50a and accordingly, CPU 51 of FIG. 1 releases the current adjusting mode set at step 101, recovers a normal electronic azimuth meter mode and finishes all of the steps.

Further, in the operation of adjusting drive current of a magnetism sensor according to the invention, when the sensitivity Sa of the magnetism detecting circuit is not provided with a desired value even in the case in which the magnetism detecting circuit is supplied with the upper limit value of the drive current, the magnetism sensor is determined as a failed product.

According to the invention, the drive current can be adjusted in accordance with the bridge resistance value of the magnetism sensor and accordingly, the dispersion in the sensitivity of the magnetism detecting circuit can be reduced to the dispersion in the sensitivity of the magnetism sensor. Therefore, not only the low sensitivity side of the electronic azimuth meter according to the invention is improved but also promotion of accuracy is achieved.

What is claimed is:

1. A method of adjusting drive current of a magnetism sensor which is a method of adjusting drive current of a magnetism sensor of a magnetism detecting circuit in which sensor driving means having a drive current source capable of supplying drive current adjustable in a range of N steps, respectively drives an X-axis magnetism sensor and a Y-axis magnetism sensor in a bridge constitution by drive current having a magnitude in correspondence with drive current set values stored to drive current set value storing means, said method of adjusting drive current of a magnetism sensor is characterized in comprising the following steps of:

(1) a step of respectively measuring bridge resistance of the X-axis magnetism sensor and bridge resistance of the Y-axis magnetism sensor;

(2) a step of respectively calculating the drive current set value of the X-axis magnetism sensor and the drive current set value of the Y-axis magnetism sensor from measured values of the bridge resistance of the X-axis magnetism sensor and the bridge resistance of the Y-axis magnetism sensor: and (3) a step of respectively storing the drive current set value of the X-axis magnetism sensor and the drive current set value of the Y-axis magnetism sensor to the drive current storing means.

2. The method of adjusting drive current of a magnetism sensor according to claim 1, characterized in that a number of the drive current set values is N and is represented by an integer provided by equally dividing a certain range by N.

3. The method of adjusting drive current of a magnetism sensor according to claim 2, characterized in that N is 16.

4. An electronic azimuth meter comprising:

magnetism sensor means comprising an X-axis magnetism sensor and a Y-axis magnetism sensor;

drive current set value storing means for storing drive current set values;

sensor driving means having a drive current source capable of supplying drive current adjustable in a range of N steps for storing drive current in correspondence with the drive current set values stored to the drive current set value storing means to the magnetism sensor means;

A/D conversion means for converting an analog output of the magnetism sensor means into a digital output;

azimuth calculating means for outputting an azimuth signal by subjecting the digital output of the A/D conversion means to predetermined calculation;

displaying means for displaying an azimuth based on the azimuth signal of the azimuth calculating means; and sensor controlling means for controlling the means.

5. The electronic azimuth meter according to claim 4, characterized in that a number of the drive current set values is N and is represented by an integer provided by equally dividing a certain range by N.

6. The electronic azimuth meter according to claim 5, characterized in that N is 16.

7. The electronic azimuth meter according to claim 5, characterized in that N is 12.

8. The electronic azimuth meter according to claim 5, characterized in that N is 13.

9. An electronic azimuth meter comprising magnetism sensor means comprising an X-axis magnetism sensor and Y-axis magnetism sensor;

drive current set value storing means for storing drive current set values, sensor driving means having a drive current source capable of supplying drive current adjustable in a range of N steps for storing drive current in correspondence with the drive current set values stored to the drive current set value storing means to the magnetism sensor means, A/D conversion means for converting an analog output of the magnetism sensor means into a digital output, azimuth calculating means for outputting an azimuth signal by subjecting the digital output of the A/D conversion means to prede-
termined calculation, displaying means for displaying an azimuth based on the azimuth signal of the azimuth calculating means, and sensor controlling means for controlling the means, said electronic azimuth meter is characterized in that the drive current set values are stored to the drive current set value storing means by the following steps of:

(1) a step of respectively measuring bridge resistance of the X-axis magnetism sensor and bridge resistance of the Y-axis magnetism sensor; and (2) a step of respectively calculating the drive current set value of the X-axis magnetism sensor and the drive current set value of the Y-axis magnetism sensor from measured values of the bridge resistance of the X-axis magnetism sensor and the bridge resistance of the Y-axis magnetism sensor.

10. The electronic azimuth meter according to claim 9, characterized in that a number of the drive current set values is N and is represented by an integer provided by equally dividing a certain range by N.

11. The electronic azimuth meter according to claim 10, characertized in that N is 16.

12. An electronic azimuth meter comprising:

a magnetism sensor comprising an X-axis magnetism sensor and a Y-axis magnetism sensor;

a drive current set value storing circuit to store drive current set values;

a sensor driving circuit having a drive current source capable of supplying drive current adjustable in a range of N steps for storing drive current in correspondence with the drive current set values stored to the drive current set value storing circuit to the magnetism sensor;

an A/D converter to converte an analog output of the magnetism sensor into a digital output;

an azimuth calculator to output an azimuth signal by subjecting the digital output of the A/D converter to predetermined calculation;

a display to display an azimuth based on the azimuth signal of the azimuth calculator; and a sensor controller to control the devices.

13. The electronic azimuth meter according to claim 12, characterized in that a number of the drive current set values is N and is represented by an integer provided by equally dividing a certain range by N.

14. An electronic azimuth meter comprising:

a magnetism sensor comprising an X-axis magnetism sensor and Y-axis magnetism sensor;

a drive current set value storing circuit to store drive current set values;

a sensor driving circuit having a drive current source capable of supplying drive current adjustable in a range of N steps for storing drive current in correspondence with the drive current set values stored to the drive current set value storing circuit to the magnetism sensor;

an A/D converter to convert an analog output of the magnetism sensor into a digital output;

an azimuth calculator to output an azimuth signal by subjecting the digital output of the A/D converter to predetermined calculation;

a display to display an azimuth based on the azimuth signal of the azimuth calculator; and a sensor controller to control the device;

wherein the drive current set values are stored to the drive current set value storing cirtcuit by the following steps of:
(1) a step of respectively measuring bridge resistance of the X-axis magnetism sensor and bridge resistance of the Y-axis magnetism sensor; and
(2) a step of respectively calculating the drive current set value of the X-axis magnetism sensor and the drive current set value of the Y-axis magnetism sensor from measured values of the bridge resistance of the X-axis magnetism sensor and the bridge resistance of the Y-axis magnetism sensor.

15. The electronic azimuth meter according to claim 14, characterized in that a number of the drive current set values is N and is represented by an integer provided by equally dividing a certain range by N.

* * * * *